(12) United States Patent
Kaufmann et al.

(10) Patent No.: US 11,397,854 B2
(45) Date of Patent: Jul. 26, 2022

(54) GENERATION OF DOMAIN THESAURUS

(71) Applicant: International Business Machines Corporation, Armonk, NY (US)

(72) Inventors: Joseph M. Kaufmann, Austin, TX (US); Lakshminarayanan Krishnamurthy, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 426 days.

(21) Appl. No.: 16/396,197

(22) Filed: Apr. 26, 2019

(65) Prior Publication Data

US 2020/0342061 A1 Oct. 29, 2020

(51) Int. Cl.
*G06F 16/36* (2019.01)
*G06F 40/247* (2020.01)
*G06F 40/49* (2020.01)
*G06N 20/00* (2019.01)

(52) U.S. Cl.
CPC .......... *G06F 40/247* (2020.01); *G06F 16/374* (2019.01); *G06F 40/49* (2020.01); *G06N 20/00* (2019.01)

(58) Field of Classification Search
CPC ...... G06F 40/247; G06F 16/374; G06F 40/49; G06N 20/00
See application file for complete search history.

(56) References Cited

U.S. PATENT DOCUMENTS

| 7,162,465 B2 | 1/2007 | Jenssen et al. |
| 7,983,902 B2 | 7/2011 | Allen et al. |
| 2004/0133418 A1 | 7/2004 | Turcato et al. |
| 2009/0006359 A1 | 1/2009 | Liao |
| 2010/0198821 A1* | 8/2010 | Loritz ............... G06F 16/90332 707/728 |
| 2016/0078036 A1 | 3/2016 | Allen et al. |
| 2017/0206453 A1 | 7/2017 | Kaufmann et al. |
| 2019/0005049 A1* | 1/2019 | Mittal .................. G06F 16/316 |
| 2020/0184307 A1* | 6/2020 | Lipka ..................... G06N 3/088 |

OTHER PUBLICATIONS

Tseng, "Automatic Thesaurus Generation for Chinese Documents", 2002, Journal of the American Society for Information Science and Technology, p. 1130-1138 (Year: 2002).*
Ruiz-Casado, Maria, "Using context-window overlapping in synonym discovery and ontology extension", 2005, Proceedings of Recent Advances in Natural Language Processing (Year: 2005).*
Liebeskind, Semi-automatic Construction of Cross-period Thesaurus, 2013, Proceedings of the 7th Workshopon Language Technology for Cultural Heritage, Social Sciences, and Humanities, p. 29-35 (Year: 2013).*

* cited by examiner

*Primary Examiner* — Sonia L Gay
(74) *Attorney, Agent, or Firm* — Troutman Pepper Hamilton Sanders LLP

(57) ABSTRACT

Embodiments provide a computer implemented method for generating a domain-specific thesaurus on a cognitive system, comprising: receiving data of the domain-specific corpus and a plurality of terms of interest from a user; splitting the data of the domain-specific corpus into a plurality of sentences using natural language processing techniques; for each term in the plurality of terms of interest, retrieving a plurality of candidate sentences containing a corresponding term, from the plurality of sentences; for each candidate sentence, providing a list of synonyms of the corresponding term, wherein the synonyms are contextual alternatives in the corresponding candidate sentence; for each term in the plurality of terms of interest, tracking a frequency of each synonym, and forming a frequency map including all the synonyms of a corresponding term and the frequency of each synonym; and generating a domain-specific thesaurus based on a combination of all the synonyms in the frequency map.

17 Claims, 4 Drawing Sheets

GENERATION OF DOMAIN THESAURUS

TECHNICAL FIELD

The present disclosure relates generally to a system, method and computer program product which is used to generate one or more domain-specific thesauri.

BACKGROUND

Thesauri are widely used in natural language processing. For example, in information retrieval, thesauri are used to expand the recall space, while in machine translation; thesauri are used to help find plausible alternative translations. An open domain thesauri, such as WordNet, generally lack terms related to a particular domain. For example, WordNet is unaware that the term "rct" ("randomized control trial") in a medical domain is a synonym for "study." Thus, there is a need for domain-specific thesauri (also called domain thesauri).

Generation of thesauri is a laborious and difficult task. Human-created resources, such as WordNet, require an involvement of a large number of expert annotators, which is expensive, and doesn't scale well. Accordingly, an automatic generation of high quality domain-specific thesauri is desired.

SUMMARY

Embodiments provide a computer implemented method for generating a domain-specific thesaurus on a cognitive system, wherein the cognitive system is coupled to a domain-specific corpus, and the domain-specific corpus includes a plurality of documents related to a particular domain, the method comprising: receiving data of the domain-specific corpus and a plurality of terms of interest from a user; splitting the data of the domain-specific corpus into a plurality of sentences using natural language processing techniques; for each term in the plurality of terms of interest, retrieving a plurality of candidate sentences containing a corresponding term, from the plurality of sentences; for each candidate sentence, providing a list of synonyms of the corresponding term, wherein the synonyms are contextual alternatives in the corresponding candidate sentence; for each term in the plurality of terms of interest, tracking a frequency of each synonym, and forming a frequency map including all the synonyms of a corresponding term and the frequency of each synonym; and generating a domain-specific thesaurus based on a combination of all the synonyms in the frequency map.

Embodiments further provide a computer implemented method, further comprising: sorting the frequency map by the frequency of each synonym; removing, one or more synonyms having a frequency less than a predetermined frequency threshold, from the corresponding frequency map; and generating the domain-specific thesaurus by combining remaining synonyms in the frequency map.

Embodiments further provide a computer implemented method, wherein the domain-specific thesaurus is a text file format.

Embodiments further provide a computer implemented method, the step of providing a list of synonyms further comprising: training a synonym finder using at least two ensemble machine learning techniques; and obtaining the list of synonyms using the synonym finder.

Embodiments further provide a computer implemented method, wherein further comprising: training the synonym finder by a distributional semantic ensemble trainer using at least two distributional semantic systems.

Embodiments further provide a computer implemented method, wherein the distributional semantic systems are selected from a group comprising Word2Vec, DiSSect, GLoVE, and Glimpse.

Embodiments further provide a computer implemented method, further comprising: training the synonym finder using crowdsourcing and dependency parsing.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Embodiments of the present invention may be a system, a method, and/or a computer program product. The computer program product may include a computer readable storage medium (or media) having computer readable program instructions thereon for causing a processor to carry out aspects of the present invention.

In an embodiment, a system, method, and computer program product for generating a domain-specific thesaurus in an entirely unsupervised manner are disclosed. With the system, method and computer program product, a high-quality domain-specific thesaurus is automatically generated without human involvement. In an embodiment, distributional semantic systems and dependency parsing are utilized to obtain synonyms which match semantically and syntactically.

Figure 1:
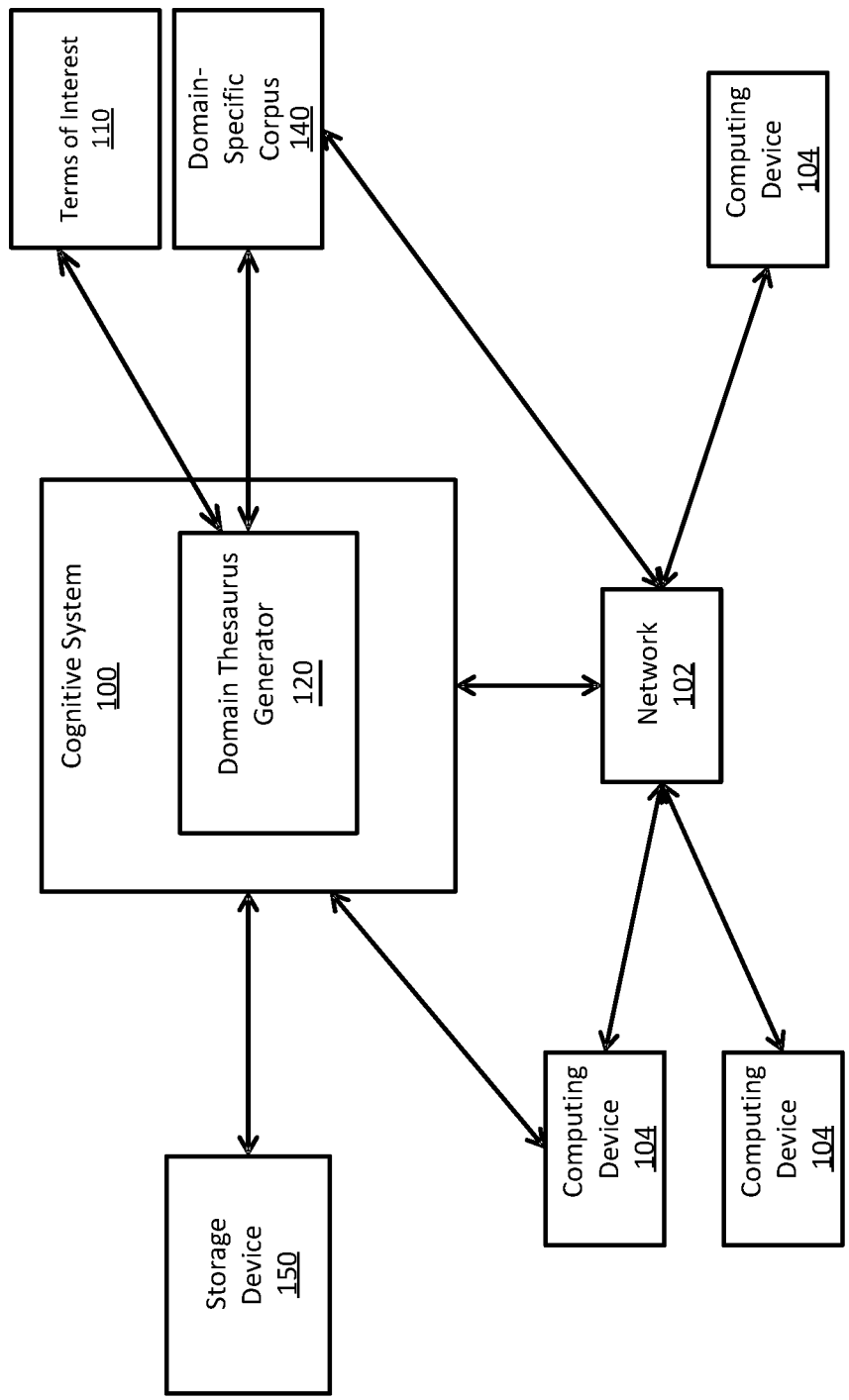
FIG. 1 depicts a schematic diagram of one illustrative embodiment of a cognitive system 100 including the domain thesaurus generator 120.

FIG. 1 depicts a schematic diagram of one illustrative embodiment of a cognitive system 100 including the domain thesaurus generator 120. The cognitive system is implemented on one or more computing devices 104 (comprising one or more processors and one or more memories, and potentially any other computing device elements generally known in the art including buses, storage devices, communication interfaces, and the like) connected to the computer network 102. A plurality of computing devices 104 communicate with each other through the computer network 102. The computer network 102 can be one or more wired and/or wireless data communication links, where each communication link comprises one or more of wires, routers, switches, transmitters, receivers, or the like.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

Navigate the complexities of human language and understanding
  Ingest and process vast amounts of structured and unstructured data
  Generate and evaluate hypotheses
  Weigh and evaluate responses that are based only on relevant evidence
  Provide situation-specific advice, insights, and guidance
  Improve knowledge and learn with each iteration and interaction through machine learning processes
  Enable decision making at the point of impact (contextual guidance)
  Scale in proportion to the task
  Extend and magnify human expertise and cognition
  Identify resonating, human-like attributes and traits from natural language
  Deduce various language specific or agnostic attributes from natural language
  High degree of relevant recollection from data points (images, text, voice) (memorization and recall)
  Predict and sense with situation awareness that mimic human cognition based on experiences The cognitive system 100 is configured to receive inputs from various sources. For example, the cognitive system 100 receives input from the computer network 102, a corpus of electronic documents 140 which is related to a particular domain (e.g., a medical domain). In one embodiment, some or all of the inputs to the cognitive system 100 are routed through the computer network 102. The various computing devices 104 include access points for content creators and cognitive system users. Some of the computing devices 104 include devices for a database storing the domain-specific corpus of data 140. The computer network 102 includes local network connections and remote connections in various embodiments, such that the cognitive system 100 may operate in environments of any size, including local and global, e.g., the Internet.

In one embodiment, the content provider provides the domain-specific corpus of data 140. The data of domain-specific corpus 140 includes any file, text, article, or source of data for use in the cognitive system 100. The domain thesaurus generator 120 receives data of domain-specific corpus 140, and divides data of the domain-specific corpus into separate sentences. The domain thesaurus generator 120 also receives a large set of terms of interest 110 from the content provider. For each term in the set, one or more candidate sentences including the corresponding term are retrieved. For each candidate sentence, a list of synonyms that make sense as contextual alternatives to the corresponding term is provided. For each term, the frequency of each synonym (i.e., how many times each synonym are suggested in different candidate sentences for the corresponding term) are kept track of, and thus a frequency map (synonym, frequency of synonym) is accordingly formed. The frequency map is then sorted by the frequency, and one or more synonyms having a frequency less than a predetermined frequency threshold are removed from the frequency map. Finally, a domain-specific thesaurus is generated based on a combination of the remaining synonyms in the frequency map.

In an embodiment, the generated domain-specific thesaurus may be stored in storage device 150 associated with the cognitive system 100. The storage device 150 may be a memory, a hard disk based storage device, flash memory, solid state storage device, or the like.

Figure 2:
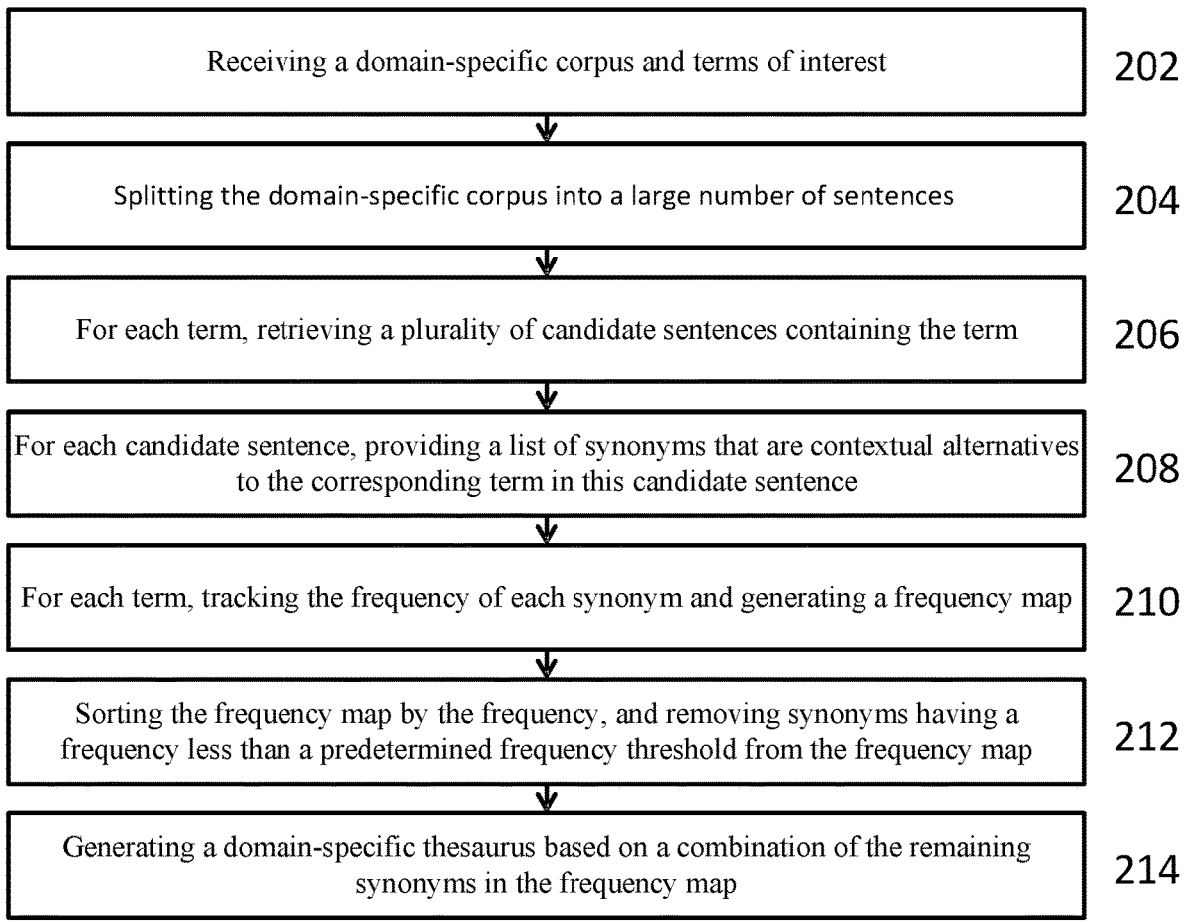
FIG. 2 is a flowchart 200 illustrating a method of generating a domain-specific thesaurus, according to embodiments herein.

FIG. 2 is a flowchart 200 illustrating a method of generating a domain-specific thesaurus, according to embodiments herein. At step 202, a domain-specific corpus (e.g., a corpus related to a medical domain), and terms of interest (i.e., the terms based on which the domain-specific thesaurus is generated) are received from a user.

At step 204, the domain-specific corpus is spilt into a large number of sentences using natural language processing techniques.

At step 206, for each term, a plurality of candidate sentences containing the corresponding term are retrieved from the large number of sentences.

At step 208, for each candidate sentence, a list of synonyms that are contextual alternatives to the corresponding term in this candidate sentence is provided. The list of synonyms takes into account the context of this candidate sentence. The list of synonyms can be obtained, for example, through a method recited in the U.S. patent application Ser. No. 15/000,582, which is incorporated herein by reference in its entirety.

At step 210, for each term, the frequency of each synonym (i.e., how many times each synonym are suggested in different candidate sentences for the corresponding term) are kept track of, and thus a frequency map (synonym, frequency of synonym) is accordingly formed. For example, the frequency map of the term "treatment" includes a plurality of synonyms and the corresponding frequency of each synonym, such as therapy=34 (the word "therapy" is a synonym of "treatment," and "34" represents the frequency of "therapy"); chemotherapy=33; self-treatment=25; radiotherapy=6, and the like.

At step 212, the frequency map is then sorted by the frequency, and one or more synonyms having a frequency less than a predetermined frequency threshold are removed from the frequency map. The frequency map is then sorted or ranked by the frequency of each synonym in the frequency map. Any synonyms having a frequency less than a predetermined frequency threshold are removed from the frequency map. For example, if the frequency threshold is 7 for the term of interest "treatment", then any synonyms having a frequency less than 7, such as radiotherapy=6, are removed from the frequency map.

At step 214, a domain-specific thesaurus is generated based on a combination of the remaining synonyms in the frequency map. The remaining synonyms in the frequency map are collected together to form a domain-specific thesaurus for the terms of interest. For example, a text file "thesaurus.txt" for the medical domain is generated and provided to the user. The domain-specific thesaurus can be generated in any format which is convenient for the user. In a medical domain-specific thesaurus, for example, the top five synonyms for the term "study" are "rct," "multicenter," "meta-analysis," "case-study," and "double-blind;" the top five synonyms for the term "treatment" are "treatments," "therapy," "chemotherapy," "chemoradiotherapy," and "photocoagulation;" the top five synonyms for the term "result" are "findings," "conclusions," "outcomes," "nnts," and "p-values."

Figure 3:
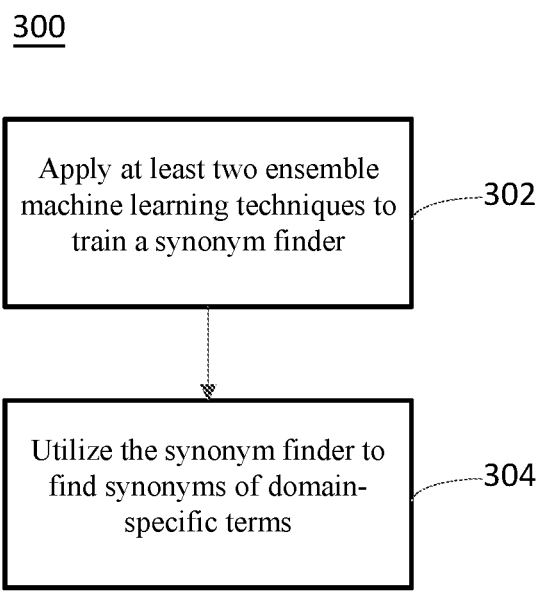
FIG. 3 is a flowchart 300 illustrating a method of retrieving synonyms of a domain-specific term, according to embodiments herein.

FIG. 3 is a flowchart 300 illustrating a method of retrieving synonyms of a domain-specific term, according to embodiments herein. FIG. 3 discloses the step 208 as shown in FIG. 2 in more detail. At 302, at least two ensemble machine learning techniques are applied to train a synonym finder. The distributional semantic ensemble trainer operates to train a distributional semantic ensemble (i.e., an ensemble of distributional semantic systems) so that the distributional semantic systems are capable of producing domain-specific synonyms. To train the distributional semantic ensemble, two or more distributional semantic systems are selected. A distributional semantic system may be defined as an algorithm that uses as an input a set of text or a corpus and produces a vector representation for each word in the set of text or corpus. Examples of distributional semantic systems include, but are not limited to, Word2Vec, DiSSect, GLoVE, and Glimpse. By utilizing the output of multiple distributional semantic systems, increased accuracy is obtained. For example, each distributional semantic system may have various strengths and weaknesses; one system may be good at finding synonyms which occur near and/or together in text, while another system may use syntactic context to find synonyms that appear in similar syntactic patterns.

According to an embodiment, the distributional semantic ensemble trainer may implement one or more methods for training, depending on various factors such as, for example, the types of selected distributional semantic systems. In one embodiment, crowdsourcing may be used for training. In particular, as one crowdsourcing example, annotators can be asked to evaluate a pair of synonyms (e.g., in the context of a sentence) on a scale of 1-5. Using this training data, the distributional semantic ensemble trainer is able to learn to identify the systems that are in line with human judgment. This advantageously allows for the distributional semantic ensemble trainer to be operable on various domains without needing to be retrained.

In an embodiment, dependency parsing can also be utilized to train a synonym finder. Dependency parsing is a task of recognizing a sentence and assigning a syntactic structure to it. The conventional syntactic structure is a parse tree which can be generated using parsing algorithms.

At 304, the distributional semantic ensemble utilizes the synonym finder (i.e., the distributional semantic ensemble trainer) to find synonyms of terms in the candidate synonym list. The terms of interest related to a particular domain are inputted to the distributional semantic ensemble, which utilizes the training of the ensemble of distributional semantic systems to generate synonyms for each term. According to an embodiment, the number of synonyms generated per term may be specified as a configurable parameter, as established by a user or administrator.

Figure 4:
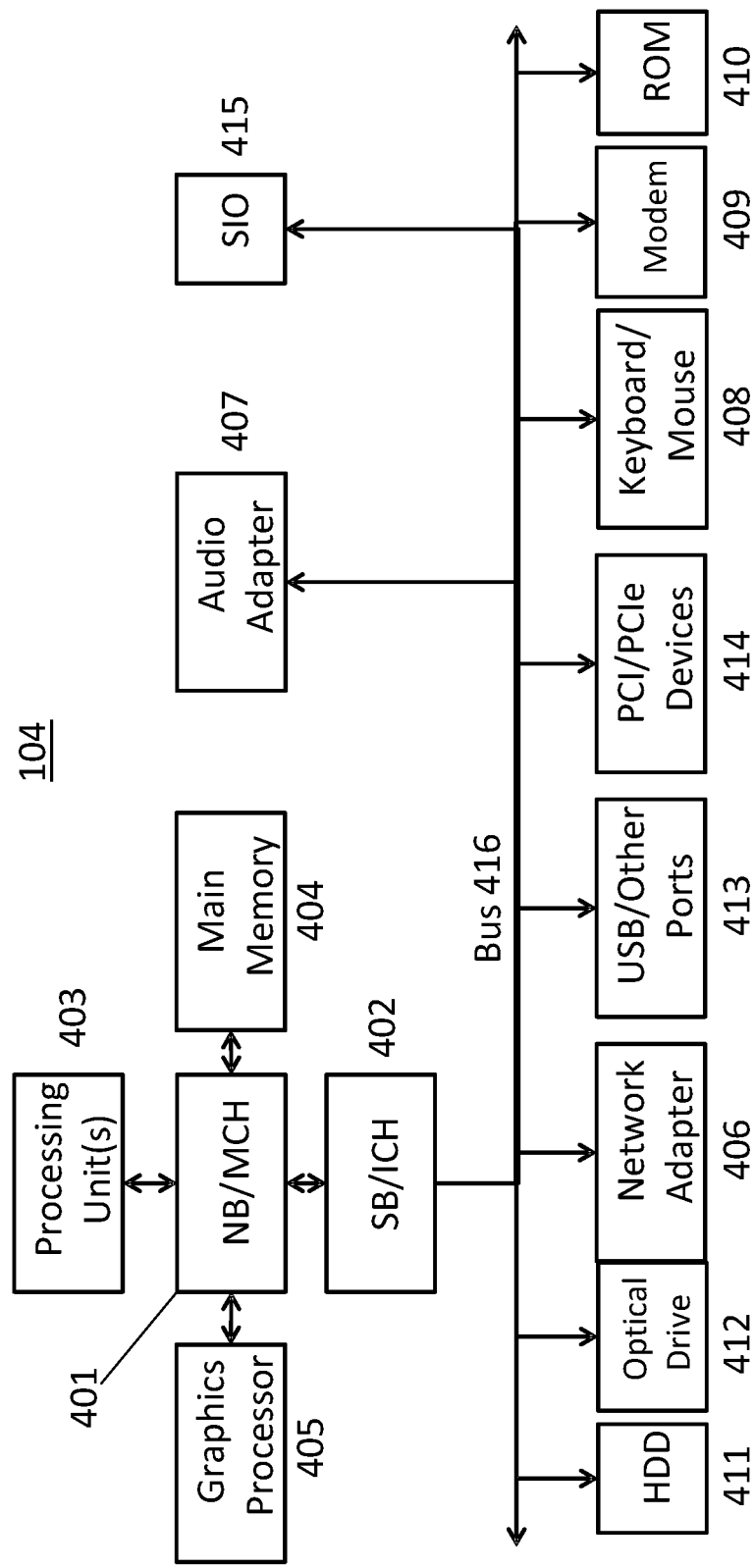
FIG. 4 is a block diagram of another example computer device system 104 in which aspects of the illustrative embodiments may be implemented.

FIG. 4 is a block diagram of an example computer device 104 in which aspects of the illustrative embodiments may be implemented. The computer device 104 is an example of a computer, such as a server or client, in which computer usable code or instructions implementing the process for illustrative embodiments of the present invention are located. In one embodiment, FIG. 4 represents a server computing device, such as a server, which implements cognitive system 100 and described herein.

In the depicted example, the computer device 104 may employ a hub architecture including a north bridge and memory controller hub (NB/MCH) 401 and south bridge and input/output (I/O) controller hub (SB/ICH) 402. Processing unit 403, main memory 404, and graphics processor 405 may be connected to the NB/MCH 401. Graphics processor 405 may be connected to the NB/MCH 401 through an accelerated graphics port (AGP).

In the depicted example, the network adapter 406 connects to the SB/ICH 402. The audio adapter 407, keyboard and mouse adapter 408, modem 409, read only memory (ROM) 410, hard disk drive (HDD) 411, optical drive (CD or DVD) 412, universal serial bus (USB) ports and other communication ports 413, and the PCI/PCIe devices 414 may connect to the SB/ICH 402 through bus system 416. PCI/PCIe devices 414 may include Ethernet adapters, add-in cards, and PC cards for notebook computers. ROM 410 may be, for example, a flash basic input/output system (BIOS). The HDD 411 and optical drive 412 may use an integrated drive electronics (IDE) or serial advanced technology attachment (SATA) interface. The super I/O (SIO) device 415 may be connected to the SB/ICH.

An operating system may run on processing unit 403. The operating system could coordinate and provide control of various components within the computer device 104. As a client, the operating system may be a commercially available operating system. An object-oriented programming system, such as the Java™ programming system, may run in conjunction with the operating system and provide calls to the operating system from the object-oriented programs or applications executing on the computer device 104. As a server, the computer device 104 may be an IBM® eServer™ System p® running the Advanced Interactive Executive operating system or the Linux operating system. The computer device 104 may be a symmetric multiprocessor (SMP) system that may include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments of the generation system may be performed by the processing unit 403 using computer usable program code, which may be located in a memory such as, for example, main memory 404, ROM 410, or in one or more peripheral devices.

A bus system 416 may be comprised of one or more busses. The bus system 416 may be implemented using any type of communication fabric or architecture that may provide for a transfer of data between different components or devices attached to the fabric or architecture. A communication unit such as the modem 409 or network adapter 406 may include one or more devices that may be used to transmit and receive data.

Those of ordinary skill in the art will appreciate that the hardware depicted in FIG. 4 may vary depending on the implementation. Other internal hardware or peripheral devices, such as flash memory, equivalent non-volatile memory, or optical disk drives may be used in addition to or in place of the hardware depicted. Moreover, the computer device 104 may take the form of a number of different data processing systems, including but not limited to, client computing devices, server computing devices, tablet computers, laptop computers, telephone or other communication devices, personal digital assistants, and the like. Essentially, computer device 104 may be any known or later developed data processing system without architectural limitation.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one may also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes may be implemented using hardware components, software components, and/or combinations thereof. No claim element herein is to be construed under the provisions of 35 U.S.C. 112 (f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method for generating a domain-specific thesaurus on a cognitive system, wherein the cognitive system is coupled to a domain-specific corpus, and the domain-specific corpus includes a plurality of documents related to a particular domain, the method comprising:
   receiving data of the domain-specific corpus and a plurality of terms of interest from a user;
   splitting the data of the domain-specific corpus into a plurality of sentences using natural language processing techniques;
   for each term in the plurality of terms of interest, retrieving a plurality of candidate sentences containing a corresponding term, from the plurality of sentences, wherein the corresponding term is one of the plurality of terms of interest;
   for each candidate sentence, providing a list of synonyms of the corresponding term, wherein the synonyms are contextual alternatives in a corresponding candidate sentence;
   for each term in the plurality of terms of interest, determining a count of each synonym, and forming a frequency map including all the synonyms of a corresponding term and the count of each synonym;
   sorting the frequency map by the count of each synonym;
   removing, one or more synonyms having a count less than a predetermined count threshold, from a corresponding frequency map; and
   generating the domain-specific thesaurus by combining remaining synonyms in the frequency map.

2. The method as recited in claim 1, wherein the domain-specific thesaurus is a text file format.

3. The method as recited in claim 2, the step of providing a list of synonyms further comprising:
   training a synonym finder using at least two ensemble machine learning techniques; and
   obtaining the list of synonyms using the synonym finder.

4. The method as recited in claim 3, wherein further comprising:
   training the synonym finder by a distributional semantic ensemble trainer using at least two distributional semantic systems.

5. The method as recited in claim 4, wherein the distributional semantic systems are selected from a group comprising Word2Vec, DiSSect, GLoVE, and Glimpse.

6. The method as recited in claim 3, further comprising:
   training the synonym finder using crowdsourcing and dependency parsing.

7. A computer program product for generating a domain-specific thesaurus on a cognitive system, the computer program product comprising a computer readable storage medium having program instructions embodied therewith, the program instructions executable by a processor to cause the processor to:
   receive data of the domain-specific corpus and a plurality of terms of interest from a user;
   split the data of the domain-specific corpus into a plurality of sentences using natural language processing techniques;
   for each term in the plurality of terms of interest, retrieve a plurality of candidate sentences containing a corresponding term, from the plurality of sentences, wherein the corresponding term is one of the plurality of terms of interest;
   for each candidate sentence, provide a list of synonyms of the corresponding term, wherein the synonyms are contextual alternatives in a corresponding candidate sentence;
   for each term in the plurality of terms of interest, determine a count of each synonym, and forming a frequency map including all the synonyms of a corresponding term and the count of each synonym; sort the frequency map by the count of each synonym;
   remove one or more synonyms having a count less than a predetermined count threshold, from a corresponding frequency map; and
   generate the domain-specific thesaurus by combining remaining synonyms in the frequency map.

8. The computer program product as recited in claim 7, wherein the domain-specific thesaurus is a text file format.

9. The computer program product as recited in claim 8, wherein the processor is further caused to
   train a synonym finder using at least two ensemble machine learning techniques; and
   obtain the list of synonyms using the synonym finder.

10. The computer program product as recited in claim 9, wherein the processor is further caused to train the synonym finder by a distributional semantic ensemble trainer using at least two distributional semantic systems.

11. The computer program product as recited in claim 10, wherein the distributional semantic systems are selected from a group comprising Word2Vec, DiSSect, GLoVE, and Glimpse.

12. The computer program product as recited in claim 9, wherein the processor is further caused to train the synonym finder using crowdsourcing and dependency parsing.

13. A system for generating a domain-specific thesaurus on a cognitive system, comprising:
   a processor configured to:
      receive data of the domain-specific corpus and a plurality of terms of interest from a user;
      split the data of the domain-specific corpus into a plurality of sentences using natural language processing techniques;
   for each term in the plurality of terms of interest, retrieve a plurality of candidate sentences containing a corresponding term, from the plurality of sentences, wherein the corresponding term is one of the plurality of terms of interest;
   for each candidate sentence, provide a list of synonyms of the corresponding term, wherein the synonyms are contextual alternatives in a corresponding candidate sentence;
   for each term in the plurality of terms of interest, determine a count of each synonym, and forming a frequency map including all the synonyms of a corresponding term and the count of each synonym;
   sort the frequency map by the count of each synonym;
   remove one or more synonyms having a count less than a predetermined count threshold, from a corresponding frequency map; and
   generate the domain-specific thesaurus by combining remaining synonyms in the frequency map.

14. The system as recited in claim 13, wherein the domain-specific thesaurus is a text file format.

15. The system as recited in claim 14, wherein the processor is further configured to:
   train a synonym finder using at least two ensemble machine learning techniques; and
   obtain the list of synonyms using the synonym finder.

16. The system as recited in claim 15, wherein the processor is further configured to:
   train the synonym finder by a distributional semantic ensemble trainer using at least two distributional semantic systems.

17. The system as recited in claim 16, wherein the distributional semantic systems are selected from a group comprising Word2Vec, DiSSect, GLoVE, and Glimpse.

\* \* \* \* \*